United States Patent [19]

Terwilliger et al.

[11] Patent Number: 4,858,938
[45] Date of Patent: Aug. 22, 1989

[54] TWO PIECE COLLET WITH INTERLOCKING COLLET SEGMENTS

[75] Inventors: Donald N. Terwilliger, Millerton, Pa.; Richard C. Knox, Horseheads, N.Y.

[73] Assignee: Hardinge Brothers, Inc., Elmira, N.Y.

[21] Appl. No.: 179,637

[22] Filed: Apr. 8, 1988

[51] Int. Cl.$^4$ ............................................. B23B 31/20
[52] U.S. Cl. ................................... 279/57; 279/1 Q; 279/1 ME; 279/58
[58] Field of Search ................ 279/1 ME, 46 R, 1 Q, 279/1 R, 55, 57, 58, 1 A, 49, 56, 57, 59; 277/199, 192, 186

[56] References Cited

U.S. PATENT DOCUMENTS

| | | |
|---|---|---|
| 3,539,193 | 10/1968 | Parsons . |
| 3,961,800 | 6/1976 | Peterson et al. . |
| 4,040,636 | 8/1977 | Albertson et al. ............... 277/185 X |
| 4,214,766 | 7/1980 | Rall et al. . |
| 4,251,084 | 2/1981 | Franklin . |
| 4,309,041 | 1/1982 | Peterson et al. . |

FOREIGN PATENT DOCUMENTS

| | | |
|---|---|---|
| 3114786 | 1/1983 | Fed. Rep. of Germany ..... 279/15 J |
| 2025278 | 1/1980 | United Kingdom . |

Primary Examiner—Z. R. Bilinsky
Assistant Examiner—Robert Schultz
Attorney, Agent, or Firm—Shlesinger & Myers

[57] ABSTRACT

A collet head for securing to a collet body for machine tools has a plurality of spaced segments arranged in a circular configuration having spaced slots between each segment. Each segment has a front face, a rear face, an inside work gripping surface, an outer cam surface and left and right side faces. Each segment also has an extraction hole in the front face thereof for receiving extraction tool fingers. On the left and right side faces of each segment is a lock recess extending from the front face of the segment and extending rearwardly towards the rear face. The lock recess comprises an enlarged portion and a narrow portion. The narrow portion of the lock recess opens into the respective side face of the segment. Each of the lock recesses cooperates with the lock recess on the adjacent side face of the adjacent segment. A plurality of removable sealing spring means are provided and inserted into each of the spaced slots between each segment and into each of the cooperating pair of lock recesses, thus locking the segments together to form the collet head. The collet head at its rear face has means for securing the collet head to the collet body.

12 Claims, 3 Drawing Sheets

TWO PIECE COLLET WITH INTERLOCKING COLLET SEGMENTS

FIELD OF THE INVENTION

The present invention relates generally to a machine collet and particularly to a two-piece collet for holding a work piece on a turning and milling machine.

BACKGROUND OF THE INVENTION

Collets are normally used in lathe machines for holding work stocks, usually bar of rods stocks, for machining. A collet comprises a tubular body having a plurality of work gripping segments at one end. On the outside radial surface of the gripping segments is formed a frustoconical surface. The collet fits into the spindle of a lathe. The spindle has a frustoconical surface which cooperates with the frustoconical surface on the work gripping segments. When the collet is moved relative to the spindle, the work gripping segments will either close and grip the work stock or open to release the work stock. Spring means for spreading the work gripping segments when pressure is released is usually provided in the body of the collet.

In a high speed production type lathe, the opening and closing action of the collet is performed with high frequency. This contributes to the breakage in the spring means in the collet body. When this occurs the whole collet has to be drawn out of the machine which could be a time consuming procedure. Breakage also occurs on the work gripping segments requiring the same lengthy replacement procedure as when the breakage occurs in the body of the collet.

To overcome the disadvantage described above, collets were later designed such that the work gripping fingers are separate from the collet body. With this improvement, replacement of the work gripping segments due to breakage could be carried out without taking the whole collet from the machine. But in one particular design, described in Peterson, U.S. Pat. No. 3,961,800, the spring means was retained in the collet body, thus still requiring the removal of the collet body from the machine when breakage occurs in the spring means. Another example is described in Parsons, U.S. Pat. No. 3,539,193, using removable work gripping pads and sealing members.

Subsequent improvement on the two piece collet resulted in incorporating the spring means in the work gripping segments themselves. An example of this design is disclosed in Peterson, U.S. Pat. No. 4,309,041. It discloses the use of springs and rubber seals in the work gripping segments in such a way that when pressure is released on the work gripping segments, the springs tend to urge the work gripping segments apart. Another example of this particular device is described in Rall, U.S. Pat. No. 4,214,766. This describes the use of volcanized rubber bonded to the work gripping segments in the same manner such that they will urge the segments apart when pressure on the collet is removed. The disadvantage of this particular design is that when the volcanized rubber wears out, the whole collet head has to be shipped to the manufacturer for replacement of the rubber material.

OBJECTS OF THE INVENTION

It is therefore an object of the invention to provide an improved two-piece collet.

It is also an object of the invention to provide a two piece collet with easily replaceable head.

It is a further object of the invention to provide a collet head with easily replaceable spring means.

Still another of this invention is to provide a two piece collet with minimum parts.

Another object of the invention is to provide a two-piece collet having rubber seals that are easily replaceable in the shop.

Yet another object of the invention is to provide a two piece collet having shop replaceable rubber seals with spring means.

DESCRIPTION OF THE INVENTION

Figure 1:
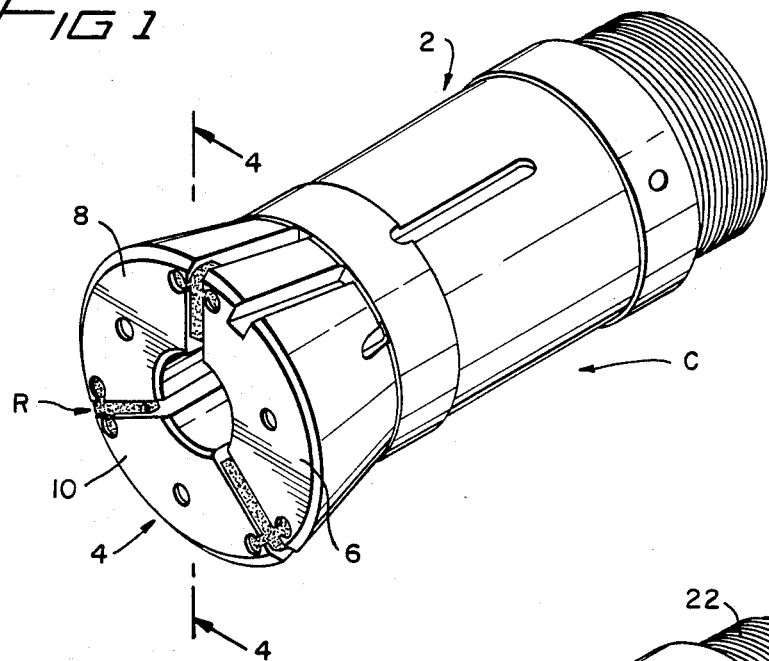
FIG. 1 shows a two piece collet made according to the invention.

The invention will now be described with more particularity, and referring to FIG. 1, the collet assembly of the invention generally designated as C is seen to include a collet body 2 and a collet head 4 comprising a plurality of segments 6, 8 and 10 and a respective number of rubber inserts R.

Figure 2:
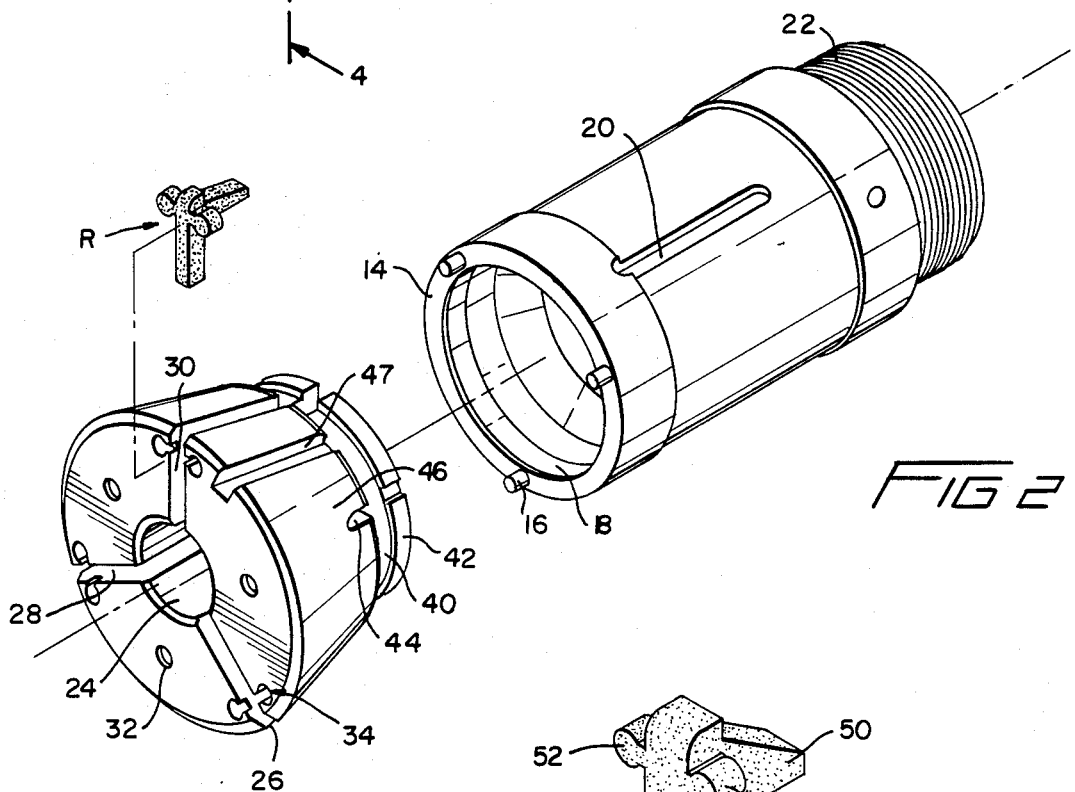
FIG. 2 is an exploded view of the collet, showing a collet body, a collet head having a plurality of segments and a rubber insert.

Referring now to FIG. 2, the collet body 2 is tubular in form. On the front face 14 of the collet body 2 are a plurality of dowels 16 circumferentially spaced thereon and oriented parallel to the longitudinal axis of the collet body 2. On the inside surface of the collet body 2 and adjacent to the front face 14 is an annular ridge 18. The collet body 2 has a longitudinal slot 20 and threads 22 at its rear end for use in conjunction with a draw tube in the machine (not shown).

Figure 7:
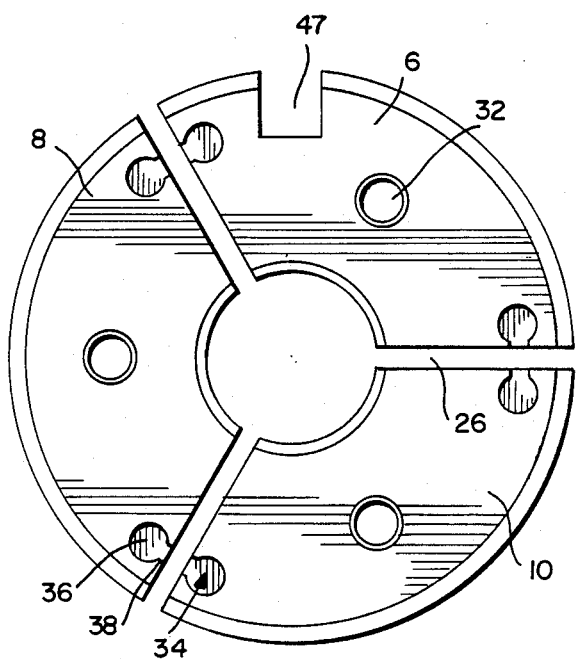
FIG. 7 shows a face view of the collet head. The rubber inserts are not shown.

The collet head 4 comprises a plurality of segments 6, 8 and 10 an equal number of rubber inserts R, a work gripping surface 24, and a slot 26 between each segment 6, 8 and 10 and forming a left surface 28 and a right surface 30 (FIG. 2) between each segment 6, 8 and 10, as viewed from the center of the collet head 4. On each segment 6, 8 and 10 is an extraction hole 32 for removal or installation of the collet head 4 from the collet body 2. The work gripping surface 24 could take many configurations depending on the requirement of the job. Shown is circular gripping surface 24, but it could equally be a hexagonal shape, threaded or grooved. On each left or right surface 28 or 30, there is a lock recess 34 comprising a seal receiving hole 36 and an opening 38 adjacent to the left or right surface 28 or 30 as best shown in FIG. 7. The width of the opening 38 is smaller than the diameter of the hole 36. The lock recess 34 has substantially a key hole configuration. On the rear portion of the collet head 4, is an annular groove 40 forming an upwardly projecting flange 42. A dowel recess 44 is formed on the cam surface 46 for each of the segments 6, 8 and 10. A keyway slot 47 which cooperates with a keyway slot in the machine (not shown) is also formed on the cam surface 46.

Figure 3:
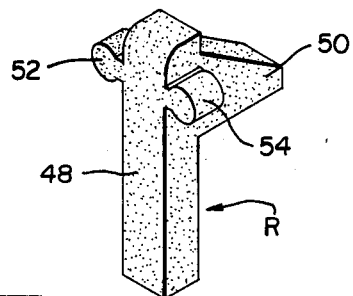
FIG. 3 shows an isometric view of the rubber insert.
Figure 8:
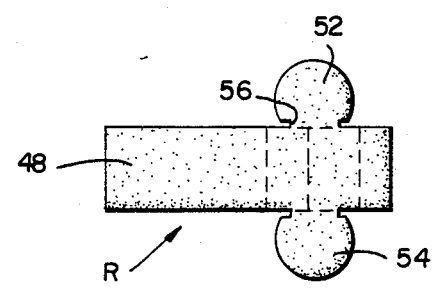
FIG. 8 shows a top view of the rubber insert.
Figure 9:
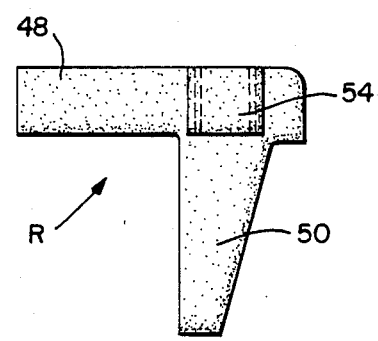
FIG. 9 is a side elevational view of the rubber insert.

Referring to FIGS. 3, 8, and 9, rubber insert R has a post 48 and an arm 50 that fit in the slot 26 between each segment 6, 8 and 10 and has substantially cylindrical lock ears 52 and 54 on each side of the post 48 that fit into the lock recesses 34. The rubber inserts R when thus installed between each segment 6, 8 and 10, serve to hold the segments 6, 8 and 10 together to form the collet head 4 prior to installation into the body 2.

Referring to FIG. 9, rubber insert R presents essentially a figure "7" configuration. The rubber insert R when installed in the collet head 4 will have the post 48 slightly recessed below the plane of the front face of the collet head 4 and the arm 50 similarly will be recessed slightly below the cam surface 46. This will allow space for the rubber insert R to expand into when being compressed without any portion of the rubber insert R extending outside the boundaries of the collet head 4 and interfering with the operation of the collet C. Referring to FIG. 8, the ears 52 and 54 of the rubber insert R shown attached to the post 48 has a shoulder 56 providing a transition between the cylindrical portions of ears 52 and 54 and post 48. The shoulder 56 cooperates with the opening 38 in the segments 6 8 and 10 of the collet head 4 when the rubber insert R is installed therein. The shoulder 56 aids in preventing premature failure of the rubber insert R due to shearing. The thickness of the post 48 and the arm 50 of the rubber insert R and the outer dimension of the ears 52 and 54 are slightly larger than the width of the segment slots 26 and the lock recess 34, respectively, in the collet head 4. This provides for the ears 52 and 54 to fit snuggly in the lock recesses 34. The slight oversize provides for an additional spring force when the collet head 4 is compressed to grab a work piece and to force the segments 6, 8 and 10 apart when the compressive force is released on the collet head 4 to release the work piece (not shown).

The rubber insert R serves several functions. The rubber insert R provides the spring means to force the segments 6, 8 and 10 forming the collet head 4 to open up when closing pressure is removed from the collet head 4 to release the work piece (not shown). When head 4 is in the closed position, the rubber inserts R are highly compressed and because the rubber inserts R are resilient, they return to their original shape when the compressive pressure is removed. This causes the rubber inserts R to expand and to force open the segments 6, 8 and 10 of the collet head 4 when the closing pressure is removed. The rubber insert R, made from Neoprene, oil resistant rubber, preferably would have a hardness of 50-60 Durometer. Further, the rubber insert R holds the segments 6, 8 and 10 forming the collet head 4 together prior to installation of the collet head 4 into the collet body 2. It also seals the head 4 from contaminants, such as oil and cooling fluids, that might otherwise foul up the collet C.

The collet head 4 receives a different heat treatment than the collet body 2. This is conveniently done because the collet head 4 is separate from the collet body 2.

Figure 4:
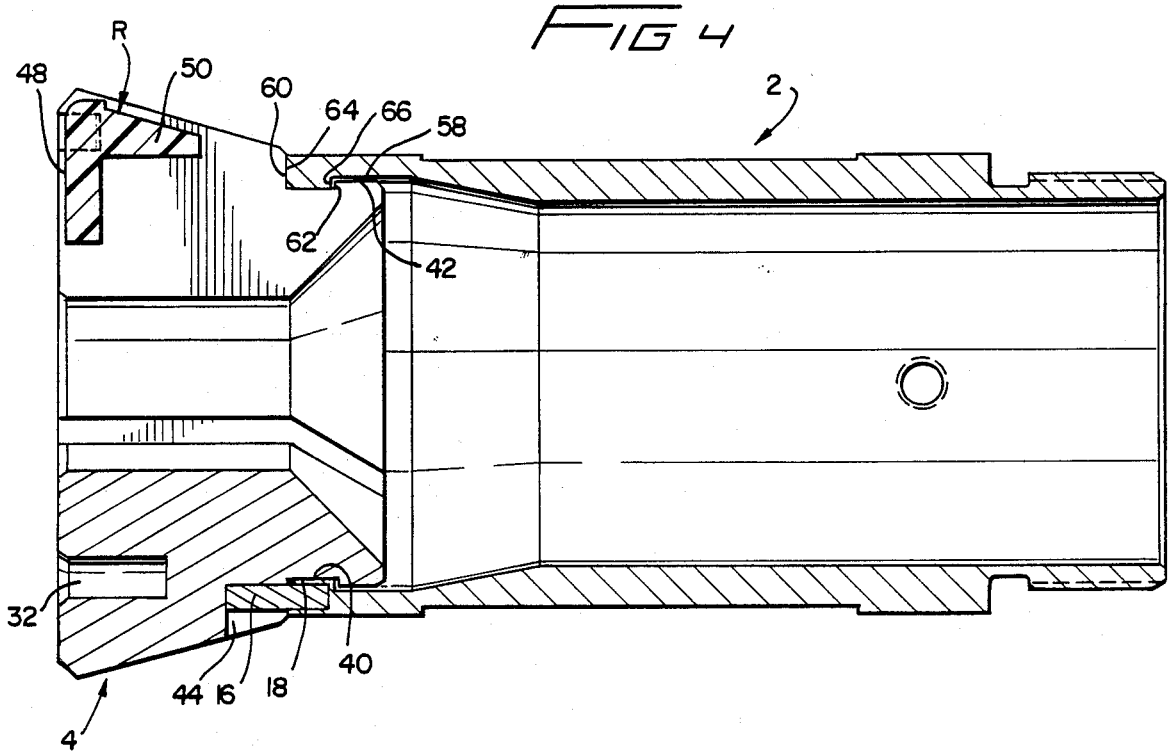
FIG. 4 is a cross-sectional view of the collet taken at section 4—4 of FIG. 1, showing the rubber insert and the securing means between the collet head and the collet body.

To assemble the collet C, rubber inserts R are installed in the slots 26 between each segment 6, 8 and 10. The lock ears 52 and 54 of the rubber inserts R are inserted into the holes 36 of the lock recesses 34. Because the opening 38 of the lock recesses 34 prevent the lock ears 52 and 54 of the rubber inserts R from sliding out of the recesses 34, the rubber insert R is effectively locked in place into the lock recesses 34, thus holding adjacent segments 6, 8 and 10 of the collet head 4 together. When all the rubber inserts are installed, the segments 6, 8 and 10 are held together and form the collet head 4. The rear end of the collet head 4 is then compressed such that the flange 42 in the collet head 4 clears the ridge 18 in the collet body 2 as the rear end of the collet head 4 is slid into the tubular body 2. As the flange 42 makes it past the ridge 18, pressure is released from the collet head 4, allowing the collet head 4 to expand and allowing flange 42 to lock with ridge 18, as best shown in FIG. 4. During the assembly, the dowel recess 44 on each segment 6, 8 and 10 of the collet head 4 is aligned with respective dowels 16 on the body 2. When fully assembled, the rubber insert R exerts outward pressure on the segment 6, 8 and 10 such that the flange 42 is urged against the collet body surface 58 in the collet body 2. Collet head surfaces 60 and 62 in the annular groove 40 in the head 4 cooperate with collet body 64 and 66 surfaces, respectively, in the collet head 2 to prevent longitudinal motion of the collet head 4 relative to the collet body 2. The dowels 16 cooperate with the dowel recesses 44 on each of segment 6, 8 and 10 of the collet head 4 to prevent rotational movement of the collet head 4 relative to the collet body 2. Although the movement is restrained as described above, the segments 6, 8 and 10 are still free to move radially when pressure on the collet head 4 is applied to grip a work piece ( not shown).

When it is required to change the collet head 4 into a different size or when the collet head 4 is damaged and requires replacement, it is not necessary to remove the collet body 2 from the machine. Removal of the collet head 4 is accomplished by compressing the collet head 4 at the rear portion by enough distance such that the flange 42 in the collet head 4 clears the ridge 18. Then the collet head 4 is easily pulled out from the collet body 2.

Figure 5:
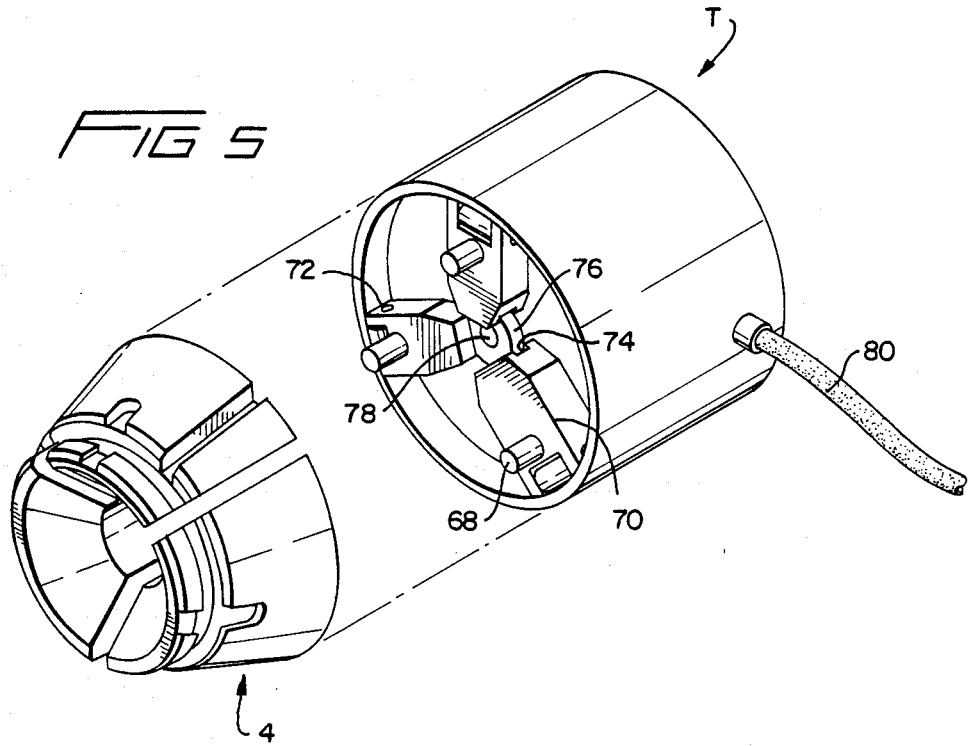
FIG. 5 is an isometric view of a tool for installing or removing the collet head from the collet body of the collet.

The installation and removal of the head 4 into the body 2 is made more convenient by the use of a tool T as best shown in FIG. 5.

The tool T comprises a plurality of extraction pins 68 transversely mounted on respective arms 70. Arms 70 are pivoted at one end at 72 and have slots 74 at the other end engaged by flange 76. Slots 74 have enough play to allow arms 70 to move about pivots 72 when flange 76 is moved along the axis of the tool T. Flange 76 is connected to a shaft 78 which in turn is operatively connected to a hydraulic actuating means (not shown) within the tool T. Hydraulic line 80 connects the tool T to a source of hydraulic pressure for actuating the hydraulic actuating means (not shown).

Figure 6:
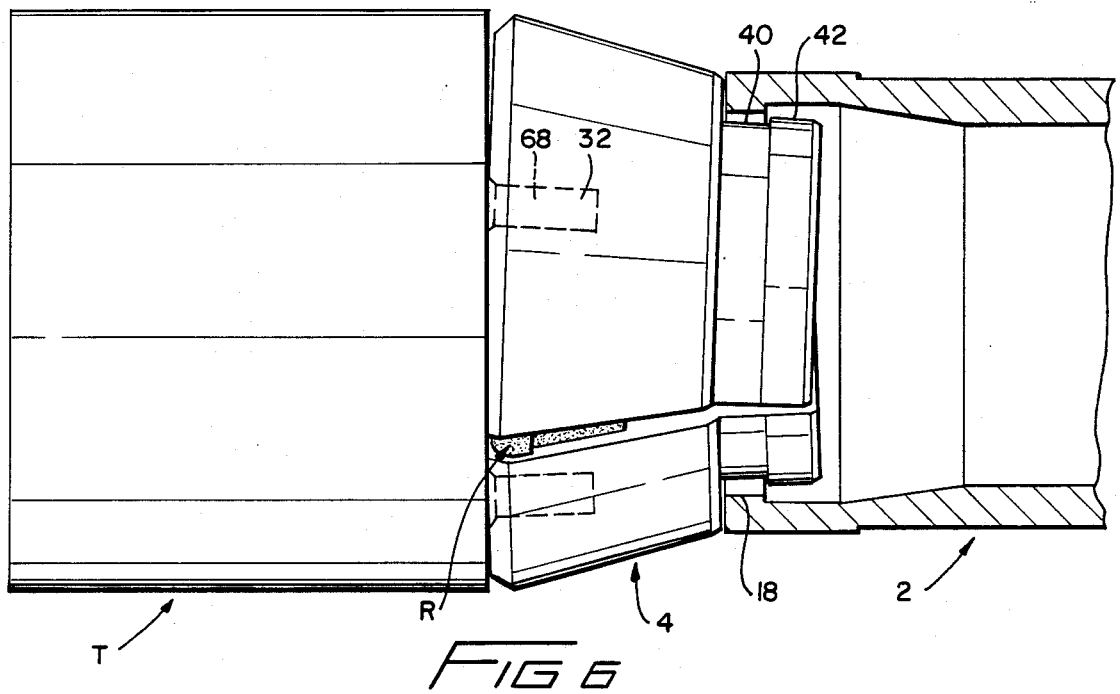
FIG. 6 shows the tool taking the collet head from the collet body.

Extraction pins 68 cooperate with respective extraction holes 32 on the front face of the collet head 4 as best shown in FIG. 6. After the extraction pins 68 are inserted into respective and cooperating extraction holes 32 in the collet head 4, the tool T is then actuated, pulling the flange 76 away from the face of the collet head 4. This action causes the arms 70 to move about pivots 72 away from the face of the collet head 4. The extraction pins 68, still engaged in the extraction holes 32 in the collet head 4, will then converge towards the longitudinal axis of the collet head 4. This action compresses the rubber inserts R and dimensionally compresses the rear of the collet head 4, making the outside diameter of flange 42 smaller than the inside diameter of the ridge 18 in the collet body 2. The collet head 4 may now be inserted into the collet body 2, as shown in FIG. 6. After the collet head 4 is in position and the dowels 16 are engaged in dowel recesses 44 in the collet head 4, the actuating force to the tool T is then released, allowing the rear part of the collet head 4 to expand outwardly by means of the resilient force exerted by the compressed rubber inserts R. The annular groove 40 will lock into the ridge 18, joining the collet head 4 to the collet head 2. The tool T may now be withdrawn from the collet head 4.

The same procedure as discussed above in using the tool T may be used to remove the collet head 4 from the collet body 2 after being joined together. In this instance, it will not be necessary to withdraw the collet body 2 from the machine in order to remove the collet head 4 from it. The removal of the collet head 4 is done while the collet body 2 remains in the machine by using the same procedure.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:

1. A collet head for being removably secured to a collet body to form a two piece collet, said collet head comprising:
   (a) a plurality of segments arranged in a circular configuration forming spaced slots between said segments;
   (b) each of said segments having a front face, a rear face, an inside work gripping surface, an outer cam surface and left and right side faces;
   (c) said segments being arranged so that the left side face of each one of said segments lies adjacent to the right side face of its corresponding adjacent segment;
   (d) each of said segments having on its left and right side faces a lock recess extending from said front face rearwardly towards said rear face;
   (e) said lock recesses opening into the respective side faces of the respective segments;
   (f) said left and said right lock recesses of adjacent segments forming cooperating pairs of lock recesses;
   (g) a plurality of removable resilient sealing spring means having laterally extending lock ears;
   (h) each one of said resilient sealing spring means inserted from said front face into each of said spaced slots with said lock ears projecting into each of said cooperating pair of lock recesses, thereby locking said segments together to form said collet head; and
   (i) means on the rear face of each of said segments for securing said collet head to said collet body.

2. A collet head, as in claim 1, wherein:
   (a) each of said resilient spring means comprises a post having left and right sides with said laterally extending lock ears extending from said left and right sides of said post.

3. A collet head, as in claim 2, wherein:
   (a) each of said resilient spring means includes an arm extending from said post on a plane normal to said laterally extending lock ears.

4. A collet head, as in claim 3, wherein:
   (a) each of said arms includes a sloped surface extending adjacent its respective outer cam surfaces of its adjacent segments.

5. A collet head, as in claim 4, wherein:
   (a) each of said lock ears include a shoulder adjacent said post for aiding in preventing shearing of said ears from said post caused by opening and closing action of said collet.

6. A two piece collet, comprising:
   (a) a collet head;
   (b) said collet head including a plurality of segments arranged in a circular configuration forming spaced slots between said segments;
   (c) each of said segments having a front face, a rear face, an inside work gripping surface, an outer cam surface and left and right side faces;
   (d) said segments being arranged so that the left side face of each one of said segments lies adjacent to the right side face of its corresponding adjacent segment;
   (e) each of said segments having on its left and right side faces a lock recess extending from said front face rearwardly towards said rear face;
   (f) said lock recesses opening into the respective side faces of the respective segments;
   (g) said left and said right lock recesses of adjacent segments forming cooperating pairs of lock recesses;
   (h) said collet head including a plurality of removable sealing resilient spring means having lateral lock ears;
   (i) each one of said resilient sealing spring means inserted from said front face into each of said spaced slots with said lock ears projecting into each of said cooperating pair of lock ears projecting into each of said cooperating pair of lock recesses, thereby locking said segments together to form said collet head;
   (j) a tubular collet body having a longitudinal axis and a front face;
   (k) said collet head having means for securing said collet head to said collet body; and
   (l) said collet body including means cooperating with said means on said collet head for securing said collet head to said collet body.

7. A collet head, as in claim 1, wherein:
   (a) each of said segments includes an extraction hole on the front face thereof for receiving an extraction tool finger.

8. A two piece collet head, as in claim 6, wherein:
   (a) said securing means of said collet head comprises an annular groove and a plurality of longitudinal slots adjacent said annular groove.

9. A two piece collet head, as in claim 8, wherein:
   (a) said cooperating securing means of said tubular collet body comprises a radially inwardly formed flange and a plurality of circumferentially spaced dowels.

10. A two piece collet head, as in claim 9, wherein:
    (a) said annular groove of said collet head cooperates with said flange of said collet body.

11. A two piece collet head, as in claim 10, wherein:

(a) said longitudinal slots adjacent said annular groove of said collet head cooperate with said dowels of said collet body.

12. A two piece collet head, as in claim 11, wherein:
(a) each of said lock recesses has a uniform cross-section comprising a narrow portion and an enlarged portion, said narrow portion extending from the side face of its respective segment to said enlarged portion.

* * * * *